No. 727,049. PATENTED MAY 5, 1903.
J. YOUNG & C. WOLFE.
WAGON BRAKE.
APPLICATION FILED OCT. 11, 1902.
NO MODEL. 2 SHEETS—SHEET 2.

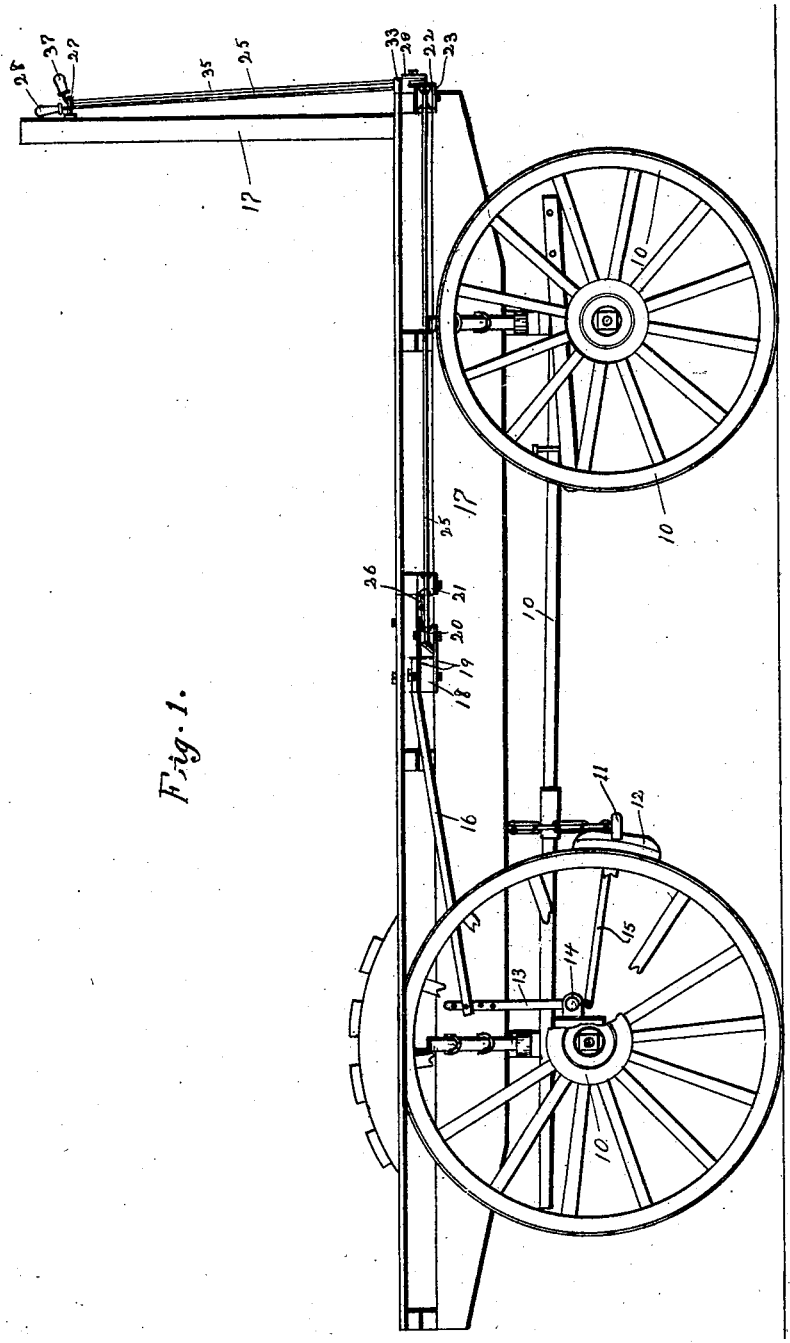

Witnesses.
E. L. Leibrock.
H. Wedgwood.

Inventors. Jehu Young and Chas. Wolfe.
by Orving Lane
Attys.

No. 727,049.

Patented May 5, 1903.

UNITED STATES PATENT OFFICE.

JEHU YOUNG AND CHARLES WOLFE, OF VICTOR, IOWA.

WAGON-BRAKE.

SPECIFICATION forming part of Letters Patent No. 727,049, dated May 5, 1903.

Application filed October 11, 1902. Serial No. 126,963. (No model.)

*To all whom it may concern:*

Be it known that we, JEHU YOUNG and CHARLES WOLFE, citizens of the United States, residing at Victor, in the county of Iowa and State of Iowa, have invented certain new and useful Improvements in Wagon-Brakes, of which the following is a specification.

Our invention relates to and consists in a device to be used in the nature of an attachment that may be applied to any ordinary wagon having a brake, to the end that the brake may be applied by a person seated on top of a load of hay or other bulky material carried by the wagon. Heretofore it has been customary for the driver of a load of hay or other bulky material to descend from the wagon and apply the brake while standing upon the ground, thus causing great loss of time and considerable inconvenience while traveling over hilly fields or rough roads.

Our object is to provide a device of simple, durable, and inexpensive construction which may be quickly and easily applied to a hay-rack mounted upon an ordinary wagon, whereby the driver seated upon the top of the load may easily and quickly apply the ordinary wagon-brake to the rear wheels or release the brake therefrom, as desired.

More specifically, it is our object to provide a readily-releasable rope-gripping device to be applied to the front of the hay-rack, so that the operator may set or release the brake by grasping the ropes at any point above the wagon-bed, so that no matter how high the load may be piled upon the wagon the operator may conveniently grasp the rope as required to operate the brake.

Our invention consists in certain details in the construction, arrangement, and combination of the various parts of a wagon-brake by which the objects above contemplated are attained, as hereinafter more fully set forth, pointed out in our claims, and illustrated in the accompanying drawings, in which—

Figure 4:
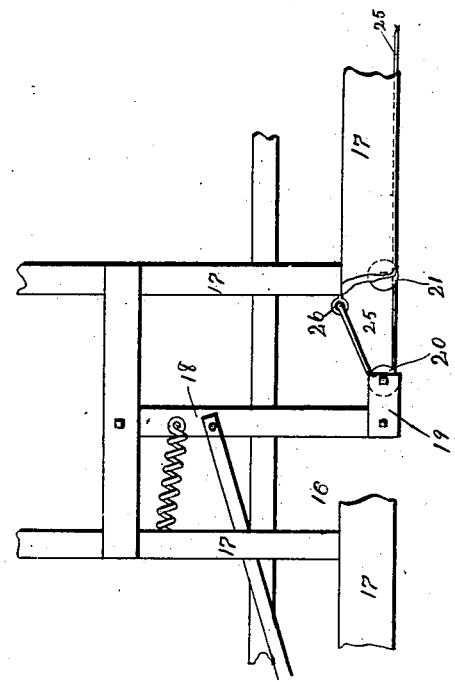
Figure 3:
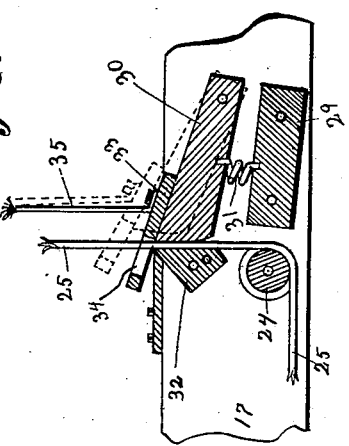
Figure 2:
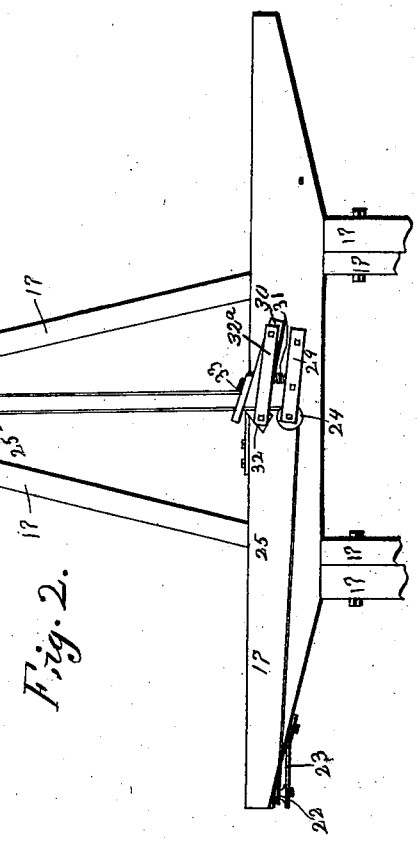

Figure 1 shows a side elevation of a wagon provided with a brake and a hay-rack on the wagon provided with our improved brake-manipulating device. Fig. 2 shows a front elevation of the hay-rack and connected parts. Fig. 3 shows an enlarged vertical sectional view of the brake-rope gripping and releasing device; and Fig. 4 shows a detailed plan view with the parts broken away, illustrating the means by which the brake-lever is applied through the agency of the rope.

Referring to the accompanying drawings, we have used the reference-numeral 10 to indicate the running-gear of the wagon, which is of ordinary construction. Connected therewith is a brake-beam 11, supporting the brake-shoe 12, designed to engage the rear wheel.

The numeral 13 indicates a lever fulcrumed at 14 to a part of the rear axle and connected, by means of link 15, with the brake-beam 11. Pivoted to the top of lever 13 is a rod 16, by which the lever is moved.

The hay-rack is also of ordinary construction and is indicated by the reference-numeral 17 and is supported upon the top of the wagon running-gear. Supported upon the hay-rack is a horizontal lever 18, having the strap 19 at one end supporting a pulley 20 between them. The bar 16 is pivoted to the central portion of this lever 18, so that as the upper end of the lever 18 is moved toward the forward end of the wagon the brake will be set, and when it moves rearwardly the brake will be released.

We have provided simple and convenient means for applying lever 18 from any point of elevation at the front of the wagon, as follows: The numeral 21 indicates a pulley supported in the hay-rack a slight distance in advance of the end of the lever 18. A pulley 22 is supported in bracket 23 at one of the front corners of the hay-rack, and the pulley 24 is supported at about the central portion of the front piece of the hay-rack. A brake-operating rope 25 is fixed at one end to an eyebolt, passes around the rear of pulley 20 and then forwardly around pulleys 21 and 22 and then upwardly around pulley 24 through an eye 27 at the top of the hay-rack, and a handle 28 is preferably attached to the upper end of said rope. Obviously when this handle is drawn upwardly the lever 18 is moved forwardly and the brake is set. We have provided means for automatically gripping this rope, as follows: The numeral 29 indicates a stationary block fixed to the front of the hay-rack adjacent to pulley 24. The numeral 30 indicates a pivoted block directly above the block 29. A contractile spring 31 is between these two blocks, normally drawing the free end of the pivoted block 30 downwardly. The numeral 32 indicates a stationary gripping-block arranged adjacent to the free end of the pivoted block 30 and directly above the pulley 24, so that rope 25 passes between the blocks 32 and 30, and the spring 31 normally causes the rope to be firmly gripped between these blocks. A strap $32^a$ connects the gripping-blocks and serves to hold the rope to position between these blocks. In top of block 30 is a plate 33, having an opening 34, through which said rope is passed, thus serving as a guide to hold said rope in position. We have attached a rope 35 to the plate 33 and extended it upwardly parallel with rope 25 through an eye 36, and a handle 37 is attached to its upper end. Obviously when the handle 37 is drawn upwardly the pivoted block 30 will be elevated, as shown by dotted lines in Fig. 3, thus permitting the rope 25 to slide freely between the gripping-blocks, thus releasing the brake.

In practical use it is obvious that our device may be readily and quickly attached to a hay-rack, and when the hay-rack is placed upon a wagon our attachment may be easily and quickly connected with the brake-lever. Then, assuming the hay-rack to be loaded with hay or other bulky substance, it is obvious that the driver upon the top of the load may easily and quickly apply the brake by simply pulling upwardly upon handle 28. By means of the pulley 20 and the lever 18 the power applied to the rope is multiplied during its transmission to the brake-lever. Hence a comparatively slight pull on said rope will cause the brake to be firmly set. As soon as the handle 28 is released the rope will be automatically gripped between blocks 30 and 32 and the brake will be locked in its set position. Whenever it is desired to release the brake, the driver simply pulls upon handle 37, thus elevating the block 30 and permitting the rope 25 to slide freely between the gripping-blocks, thus permitting the brake to move away from the rear wheels. It is obvious, further, that these ropes 25 and 35 may be run to any part of the hay-rack or the top of the load, so that the driver may station himself at any desirable point and manipulate the brake readily from such position. Furthermore, the parts are all of simple and inexpensive construction and may be easily applied, and when the hay-rack is removed from the wagon the wagon-brake may be manipulated in the ordinary way.

We are aware that devices have been used heretofore by which a person on top of a hay-rack may set the brake by means of a rope and release the brake by another rope, but we are not aware that the particular construction herein described has ever been used, nor are we aware that any of the other devices are as simple and durable as the one herein set forth.

Having thus described our invention, what we claim as new, and desire to secure by Letters Patent of the United States therefor, is—

The combination with a wagon of a brake, a lever for operating the brake, a hay-rack on the wagon, a lever fulcrumed at one end to a part of the hay-rack and extended outwardly in a horizontal plane, a spring for holding said lever in position to release the brake, a rod connecting said lever with the brake-lever, a pulley mounted in the outer end of said lever, a brake-rope fixed at one end to a part of the hay-rack, passed rearwardly around said pulley and then forwardly to the front of the hay-rack and then upwardly, direction-pulleys for guiding said rope, a stationary block at the front of the hay-rack, a pivoted gripping-block above the stationary block having a rounded gripping-face, a contractile spring connected with the pivoted gripping-block and said stationary block normally holding the pivoted blocks downwardly, a stationary gripping-block coacting with the pivoted gripping-block to cramp said rope, a strap connecting the gripping-blocks and holding the brake-rope between them, a plate secured to the pivoted gripping-block and having a guide-opening through which said rope passes holding the rope to position where it will be grasped by the gripping-block, a second rope secured to said plate whereby the pivoted gripping-block may be elevated against the spring-pressure, all arranged and combined substantially in the manner set forth and for the purposes stated.

JEHU YOUNG.
CHARLES WOLFE.

Witnesses:
JAS. ANDERSON,
CHAS. RAFFENSPERGER.